US008489948B2

(12) United States Patent
Hannuksela et al.

(10) Patent No.: US 8,489,948 B2
(45) Date of Patent: Jul. 16, 2013

(54) METHODS AND APPARATUSES FOR FACILITATING ERROR CORRECTION

(75) Inventors: Miska Hannuksela, Ruutana (FI); Vinod Kumar Malamal Vadakital, Tampere (FI)

(73) Assignee: Nokia Corporation, Espoo (FI)

( * ) Notice: Subject to any disclaimer, the term of this patent is extended or adjusted under 35 U.S.C. 154(b) by 418 days.

(21) Appl. No.: 12/753,547

(22) Filed: Apr. 2, 2010

(65) Prior Publication Data

US 2011/0246845 A1 Oct. 6, 2011

(51) Int. Cl.
*G08C 25/00* (2006.01)

(52) U.S. Cl.
USPC .......... 714/746

(58) Field of Classification Search
USPC .......... 714/746
See application file for complete search history.

(56) References Cited

U.S. PATENT DOCUMENTS

| | | | | |
|---|---|---|---|---|
| 7,940,644 | B2 * | 5/2011 | Oran et al. | 370/216 |
| 7,940,777 | B2 * | 5/2011 | Asati et al. | 370/395.52 |
| 2006/0236153 | A1 * | 10/2006 | Aaltonen | 714/25 |
| 2010/0017673 | A1 * | 1/2010 | Lu et al. | 714/749 |
| 2010/0050032 | A1 * | 2/2010 | Bichot et al. | 714/746 |

OTHER PUBLICATIONS

Search Report and Written Opinion for International Application No. PCT/IB2011/051443, mailed Jun. 10, 2011.

Liu, Leo X., et al.; "Rate-distortion Optimized Joint Source/Channel Coding of WWAN Multicast Video for a Cooperative Peer-to-Peer Collective"; IEEE Transactions on Circuits and Systems for Video Technology; vol. 21; Issue 1; Jan. 2011; [Online]; Retrieved from the Internet URL: http://www.ece.ucdavis.edu/~chuah/paper/2011/tcsvt11-jscc.pdf; pp. 1-30.

Liu, Leo X., et al.; "Structured Network Coding and Cooperative Wireless Ad-Hoc Peer-to-Peer Repair for WWAN Video Broadcast"; This paper appears in IEEE Transactions on Multimedia; Issue Date : Jun. 2009; vol. 11; Issue:4; INSPEC Accession No. 10664202; Digital Object Identifier: 10.1109/IMM.2009.2017636; Date of Publication: Apr. 2009; pp. 730-741.

Raza, S., et al.; "DiCoR: Distributed Cooperative Repair of Multimedia Broadcast Losses"; Dept. of Computer Science; University of California, Davis; Davis, CA. This paper appears in: Broadband Communications, Networks and Systems; 2008; 5th International Conference on BROADNETS 2008; Issue Date : Sep. 2008; Print ISBN: 978-1-4244-2391-0; INSPEC Accession No. 10470092; Digital Object Identifier: 10.1109/BROADNETS.2008.4769094; Date of Current Version: Jan. 27, 2009.

Zimmermann, E., et al.; "On the performance of cooperative diversity protocols in practical wireless systems"; This paper appears in: Vehicular Technology Conference, 2003; IEEE 58th; Issue Date: Oct. 2003; vol. 4; Print ISBN: 0-7803-7954-3; INSPEC Accession No. 8107806; Digital Object Identifier: 10.1109NETECF.2003.1285922; Date of Current Version: May 2004; pp. 2212-2216.

* cited by examiner

*Primary Examiner* — Yolanda L Wilson
(74) *Attorney, Agent, or Firm* — Alston & Bird LLP

(57) ABSTRACT

Methods and apparatuses are provided for facilitating error correction. A method may include receiving a content item and first repair data over a content delivery network via a first network connection. The method may further include receiving second repair data via a second network connection from a remote device having received the content item over the content delivery network. The first and second repair data may be configured to enable error correction of the content item. Corresponding apparatuses are also provided.

21 Claims, 6 Drawing Sheets

METHODS AND APPARATUSES FOR FACILITATING ERROR CORRECTION

TECHNOLOGICAL FIELD

Embodiments of the present invention relate generally to data transmission technology and, more particularly, some example embodiments relate to methods and apparatuses for facilitating error correction.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. Consequently, mobile computing devices having a small form factor have become ubiquitous and are used to access network applications and services by consumers of all socioeconomic backgrounds.

In this regard, consumers often use mobile computing devices to access services requiring transfer of data over mobile networks. For example, multimedia streaming services, including, for example, streaming of video, audio, and other multimedia content require the transfer of large amounts of data over networks. However data transferred over networks, and particularly over mobile networks, is subject to introduction of data errors during transmission due to channel noise, data collisions, and other network conditions that may impact data transfer.

BRIEF SUMMARY

Methods, apparatuses, and computer program products are herein provided for facilitating error correction. Methods, apparatuses, and computer program products in accordance with various embodiments may provide several advantages to computing devices, data networks, and computing device users. Some example embodiments provide apparatuses configured to obtain additional error correction data (also referred to as "repair data") beyond that received with the data content which the error correction data is configured to repair. In this regard, some example embodiments provide apparatuses configured to obtain additional repair data from one or more peer apparatuses via a peer-to-peer network. Obtainment of additional repair data in some example embodiments is triggered in response to a determination that repair data received with a content item is not sufficient to repair an error in the content item. In some example embodiments, obtainment of additional repair data is triggered in response to an estimation that repair data received with a content item is not sufficient to repair an error in the content item that may be introduced due to existing network conditions and/or estimated future network conditions. In this regard, some example embodiments facilitate more robust error correction by obtaining additional repair data when needed via a second network connection without burdening a first network connection over which a content item is received by requiring the additional repair data to be transferred with the content item regardless of whether the additional repair data is needed.

In a first example embodiment, a method is provided, which comprises receiving a content item and first repair data over a content delivery network via a first network connection. The method of this embodiment further comprises receiving second repair data via a second network connection from a remote device having received the content item over the content delivery network. The first and second repair data of this embodiment are configured to enable error correction of the content item.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least receive a content item and first repair data over a content delivery network via a first network connection. The at least one memory and stored computer program code are configured, with the at least one processor, to further cause the apparatus of this embodiment to receive second repair data via a second network connection from a remote device having received the content item over the content delivery network. The first and second repair data of this embodiment are configured to enable error correction of the content item.

In another example embodiment, a computer program product is provided. The computer program product of this embodiment includes at least one computer-readable storage medium having computer-readable program instructions stored therein. The program instructions of this embodiment comprise program instructions configured to cause receipt of a content item and first repair data over a content delivery network via a first network connection. The program instructions of this embodiment further comprise program instructions configured to cause receipt of second repair data via a second network connection from a remote device having received the content item over the content delivery network. The first and second repair data of this embodiment are configured to enable error correction of the content item.

In another example embodiment, an apparatus is provided that comprises means for receiving a content item and first repair data over a content delivery network via a first network connection. The apparatus of this embodiment further comprises means for receiving second repair data via a second network connection from a remote device having received the content item over the content delivery network. The first and second repair data of this embodiment are configured to enable error correction of the content item.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
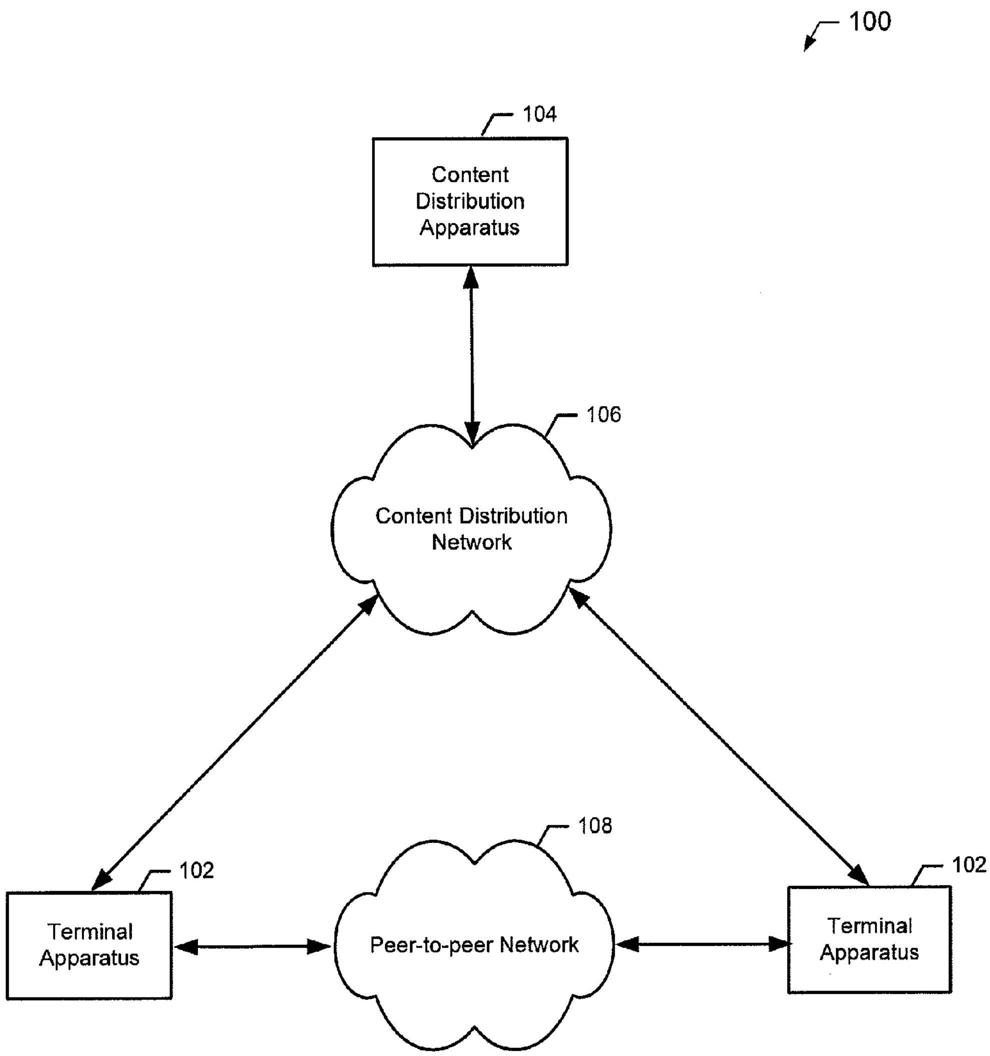
FIG. 1 illustrates a block diagram of system for facilitating error correction according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

In wireless communication, electromagnetic wave propagation principles dictate the time/space varying fluctuation of the received signal strength (RSS), experienced by a receiver. This RSS fluctuation is called fading. Fading is classified either as a fast fade or a slow fade. Fast fading can be attributed to constructive and destructive interference of radio waves caused due to multipath propagation, while slow fading is caused due to reflection, scattering and diffraction properties of radio waves in space. Slow fades are mainly caused due to the presence of large obstacles, such as buildings, hills or tunnels that interfere with the line-of-sight between a transmitter and a receiver. Fast and slow fades are manifested as bitstream errors, occurring as bursts, at the higher layers of the transmission protocol stack.

One method used to counter the burst errors due to fading in a broadcast environment is use of forward error correcting (FEC) codes (FEC). In this method, a transmitter adds controlled amount of redundant data, which helps in the recovery of erroneous data at receiver. An (n, k) FEC code encodes k symbols into n: n>k coded symbols. A Minimum Distance Separable (MDS) (n, k) FEC encoding ensures that any (n−k) corrupted symbols of the n coded symbols can be recovered, when the location of errors is known. Sometimes FEC codes are computed over blocks of source data. When FEC codes are computed over blocks of source data, the source data is referred to as "source blocks" and the coded data is referred to as "FEC blocks." If a FEC code is systematic, the source block appears as such in the FEC block and the remaining of the FEC block is occupied by FEC repair data. In contrast, no source block appears as such in the FEC blocks coded with non-systematic FEC codes.

Fast fading is observed as rapid RSS fluctuations, which manifest themselves as burst errors of small duration. Slow fades, also called shadowing, corrupt data of much larger duration than fast fades. To correct burst errors due to both fast and slow fading, it is desirable to have long FEC blocks. Data of the source block is sometimes interleaved before FEC coding. Interleaving spreads the data over time so that burst errors are converted into random or smaller burst errors. This gives the FEC code a better chance at error correction. However, block FECs and data interleaving may cause a relatively long initial delay in the receiver. In this regard, in order to utilize the FEC repair data fully, the entire FEC block has to be received before the decoding of the source block can be started.

In the case of mobile television broadcasting, the tune-in delay, often called channel switching delay, should be relatively small to achieve a good user experience. In this regard, users are used to the typical channel switching delays of terrestrial digital television, which can be approximately 0.5 seconds, and expect similar delays in mobile television. This performance expectation places a limit on the size of the source block and the amount of time-interleaving that can be applied. The limits in FEC block size and the time-interleaving depth mean that not all burst errors can be corrected. The uncorrectable errors mostly occur as large bursts, due mainly to shadowing.

Example embodiments of the invention accordingly provide systems, methods, apparatuses, and computer program products for facilitating error correction. In this regard, example embodiments of the invention facilitate error correction without causing delay in rendering media content that may negatively impact user experience.

FIG. 1 illustrates a block diagram of system 100 for facilitating error correction according to an example embodiment of the present invention. It will be appreciated that the apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a system for facilitating error correction, numerous other configurations may also be used to implement embodiments of the present invention.

In at least some embodiments, the system 100 includes a plurality of terminal apparatuses 102 and a content distribution apparatus 104. Although only two terminal apparatuses 102 are illustrated in FIG. 1 for purposes of example, it will be appreciated that the system 100 may include more than two terminal apparatuses 102.

The content distribution apparatus 104 may be embodied as one or more servers, one or more desktop computers, one or more laptop computers, one or more mobile computers, one or more network nodes, multiple computing devices in communication with each other, any combination thereof, and/or the like. In this regard, the content distribution apparatus 104 may comprise any computing device or plurality of computing devices configured to distribute content to one or more terminal apparatuses 102 over the content distribution network 106 as described herein. In various embodiments, the content distribution apparatus 104 may comprise an originator of content, encoder of content, a relay apparatus for relaying content originated or encoded by another apparatus, a content server, and/or the like. In one example embodiment, the content distribution apparatus 104 comprises a broadcast content server (BCS) storing or otherwise having access to content items to be broadcast over the content distribution network 106. Regardless of how the content distribution apparatus 104 is embodied, the content distribution apparatus 104 may be configured to disseminate content over the content distribution network 106.

A terminal apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), any combination thereof, and/or the like. In this regard, a terminal apparatus 102 may be embodied as any computing device configured to receive content and repair data distributed by the content distribution apparatus 104 over the content distribution network 106.

The content distribution network 106 may comprise a wireless network (e.g., a cellular network, wireless local area network, wireless personal area network, wireless metropolitan area network, and/or the like), a wireline network, or some combination thereof, and in some embodiments comprises at least a portion of the Internet. In one example embodiment, the content distribution network 106 comprises a digital video broad broadcasting-handheld (DVB-H) network or other mobile broadcast network.

As will be described further herein, the terminal apparatuses 102 may be configured to receive content and repair data distributed by the content distribution apparatus 104 from the content distribution apparatus 104 and/or from one or more intermediary devices having previously received the content from the content distribution apparatus 104. For example, the terminal apparatuses 102 may be configured to receive content distributed by the distribution apparatus 104 from a relay, network access point, base station, radio transmitter, and/or the like.

The terminal apparatuses 102 may be further configured to exchange repair data with other terminal apparatuses 102 via the peer-to-peer network 108. The peer-to-peer network 108 may comprise any network configured to enable a terminal apparatus 102 to receive/send repair data from/to another terminal apparatus 102. In this regard, the peer-to-peer network 108 may comprise a wireless network (e.g., a cellular network, wireless local area network, wireless personal area network, wireless metropolitan area network, and/or the like), a wireline network, or some combination thereof, and in some embodiments comprises at least a portion of the Internet. The peer-to-peer network 108 may, for example, comprise an overlay network, which may overlie an underlying network of any type. In this regard, the peer-to-peer network 108 may comprise an overlay network overlying the content distribution network 106. As another example, the peer-to-peer network 108 may comprise an ad-hoc wireless network. For example, the peer-to-peer network 108 may comprise an ad-hoc wireless network formed between two or more terminal apparatuses 102 using device-to-device communication techniques, proximity-based communication techniques (e.g., Bluetooth, wireless universal serial bus, infrared, and/or the like), and/or the like. As yet another example, the peer-to-peer network may comprise an overlay network on top of any network based on the Internet Protocol (IP), which may be entirely or partly a part of the Internet.

Membership in and distribution of repair data over the peer-to-peer network 108 may be controlled by a peer-to-peer server or other control apparatus (not shown). In embodiments wherein membership in the peer-to-peer network 108 and/or distribution of repair data over the peer-to-peer network 108 is controlled by a peer-to-peer server, the peer-to-peer server may, for example, comprise the content distribution apparatus 104.

Figure 2:
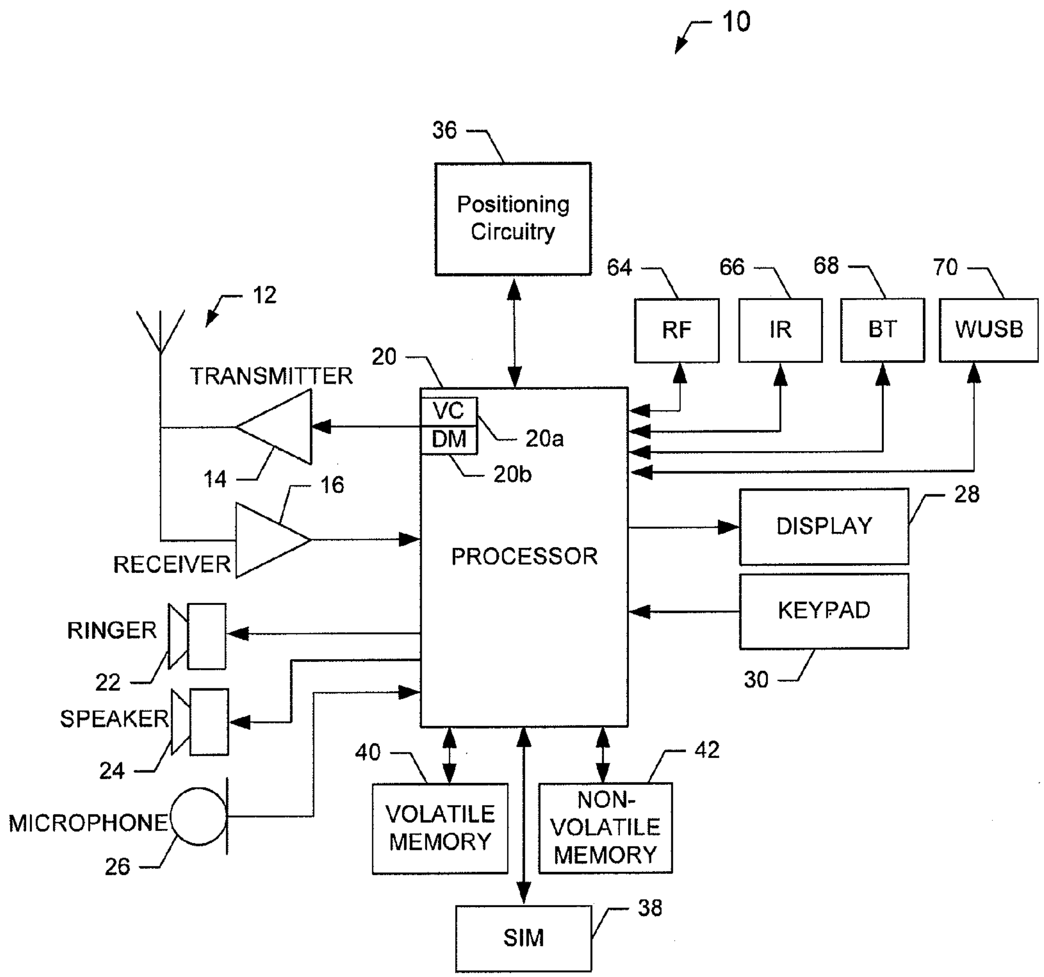
FIG. 2 is a schematic block diagram of a mobile terminal according to an example embodiment of the present invention.

In an example embodiment, a terminal apparatus 102 is embodied as a mobile terminal, such as that illustrated in FIG. 2. In this regard, FIG. 2 illustrates a block diagram of a mobile terminal 10 representative of one embodiment of a terminal apparatus 102. It should be understood, however, that the mobile terminal 10 illustrated and hereinafter described is merely illustrative of one type of terminal apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20*a*, an internal data modem (DM) 20*b*, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may include positioning circuitry 36. The positioning circuitry 36 may include, for example, a global positioning system (GPS) sensor, an assisted global positioning system (Assisted-GPS) sensor, and/or the like. In one embodiment, however, the positioning circuitry 36 includes a pedometer, accelerometer, and/or inertial sensor. Further, the positioning circuitry 36 may be configured to determine the location of the mobile terminal based upon signal triangulation or other mechanisms. The positioning circuitry 36 is configured in some embodiments to determine a location of the mobile terminal, such as latitude and longitude coordinates of the mobile terminal or a position relative to a reference point such as a destination or a start point. Information from the positioning circuitry 36 may be communicated to a memory of the mobile terminal or to another memory device to be stored as a position history, location information, motion information, and/or the like. Furthermore, the memory of the mobile terminal may store instructions for determining cell id information. In this regard, the memory may store an application program for execution by the processor 20, which determines an identity of the current cell, e.g., cell id identity or cell id information, with which the mobile terminal is in communication. In conjunction with the positioning circuitry 36, the cell id information may be used to more accurately determine a location of the mobile terminal.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
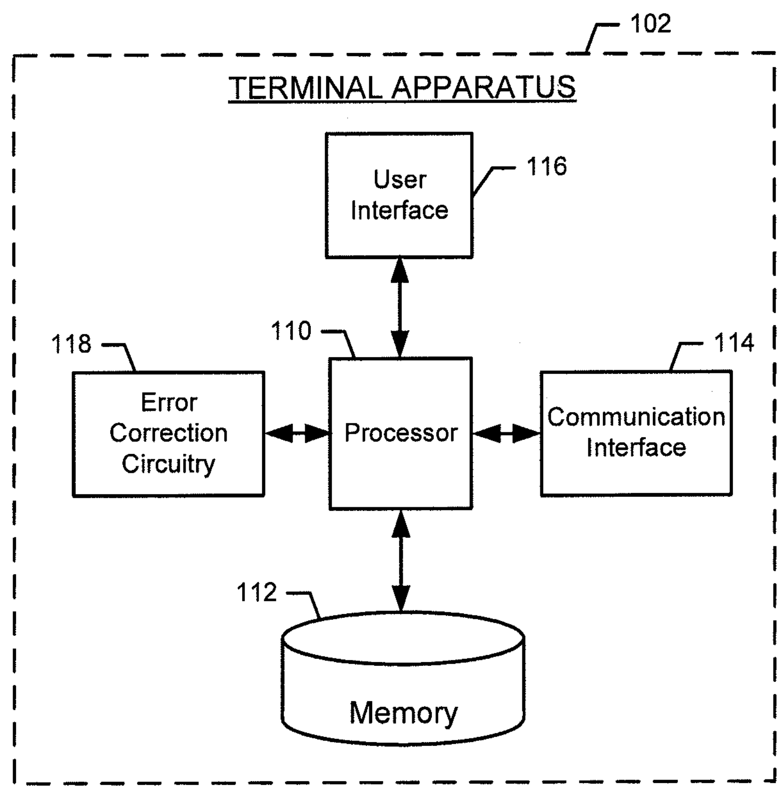
FIG. 3 illustrates a block diagram of a terminal apparatus for facilitating error correction according to an example embodiment of the present invention.

Referring now to FIG. 3, FIG. 3 illustrates a block diagram of a terminal apparatus 102 according to an example embodiment of the present invention. The terminal apparatus 102 may include various means for performing the various functions herein described. These means of the terminal apparatus 102 may include, for example, one or more of a processor 110, memory 112, communication interface 114, user interface 116, or error correction circuitry 118 These means of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the terminal apparatus 102 as described herein. In embodiments wherein the terminal apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the terminal apparatus 102 to perform one or more of the functionalities of the terminal apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 3 as a single memory, the memory 112 may comprise a plurality of memories. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 112 may comprise the volatile memory 40 and/or the non-volatile memory 42. The memory 112 may be configured to store information, data, applications, instructions, or the like for enabling the terminal apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, a content item received via the content distribution network 106, repair data, and/or the like. This stored information may be stored and/or used by the error correction circuitry 118 during the course of performing its various functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to an entity (e.g., the content distribution apparatus 104, another terminal apparatus 102, and/or the like), such as over a network (e.g., the content distribution network 106, peer-to-peer network 108, and/or the like) by which the terminal apparatus 102 is in communication with the entity. The communication interface 114 may include, for example, an antenna, a transmitter, a receiver, a transceiver and/or supporting hardware or software for enabling communications with one or more remote computing devices, such as over a network. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like (e.g., the content distribution network 106, peer-to-peer network 108, and/or the like) by which the terminal apparatus 102 and one or more computing devices are in communication. In an example embodiment, the communication interface 114 is at least partially embodied as or otherwise controlled by the processor 110. In this regard, the communication interface 114 may be in communication with the processor 110, such as via a bus. The communication interface 114 may additionally be in communication with the memory 112, user interface 116, and/or error correction circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. The user interface 116 may be in communication with the memory 112, communication interface 114, and/or error correction circuitry 118, such as via a bus.

The error correction circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the error correction circuitry 118 is embodied separately from the processor 110, the error correction circuitry 118 may be in communication with the processor 110. The error correction circuitry 118 may further be in communication with one or more of the memory 112, communication interface 114, or user interface 116, such as via a bus.

Figure 4:
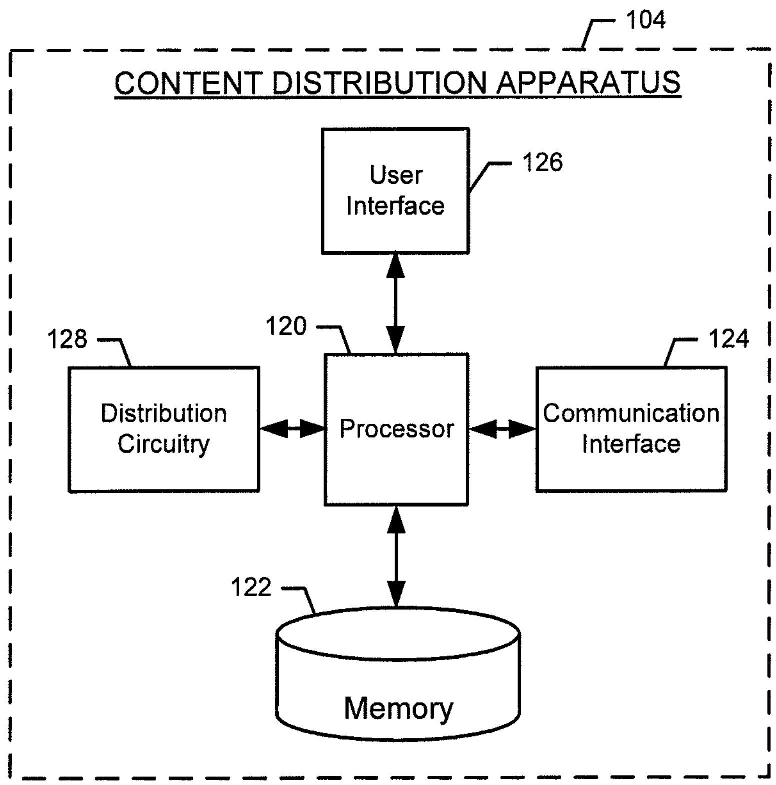
FIG. 4 illustrates a block diagram of a content distribution apparatus for facilitating error correction according to an example embodiment of the invention.

Referring now to FIG. 4, FIG. 4 illustrates a block diagram of a content distribution apparatus 104 according to an example embodiment of the present invention. The content distribution apparatus 104 may include various means for performing the various functions herein described. These means of the content distribution apparatus 104 may include, for example, one or more of a processor 120, memory 122, communication interface 124, user interface 126, or distribution circuitry 128 These means of the content distribution apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 120 comprises a plurality of processors. The plurality of processors may be in operative communication with each other and may be collectively configured to perform one or more functionalities of the content distribution apparatus 104 as described herein. The plurality of processors may be embodied on a single computing device or distributed across a plurality of computing devices collectively configured to function as the content distribution apparatus 104. In an example embodiment, the processor 120 is configured to execute instructions stored in the memory 122 or otherwise accessible to the processor 120. These instructions, when executed by the processor 120, may cause the content distribution apparatus 104 to perform one or more of the functionalities of the content distribution apparatus 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. Although illustrated in FIG. 4 as a single memory, the memory 122 may comprise a plurality of memories. The plurality of memories may be embodied on a single computing device or may be distributed across a plurality of computing devices collectively configured to function as the content distribution apparatus 104. In various example embodiments, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the content distribution apparatus 104 to carry out various functions in accordance with example embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information. The stored information may include, for example, content items for distribution to one or more terminal apparatuses 102. This stored information may be stored and/or used by the distribution circuitry 128 during the course of performing their respective functionalities.

The communication interface 124 may be embodied as any device or means embodied in circuitry, hardware, a computer program product comprising computer readable program instructions stored on a computer readable medium (e.g., the memory 122) and executed by a processing device (e.g., the processor 120), or a combination thereof that is configured to receive and/or transmit data from/to an entity, such as over a network (e.g., the content distribution network 106) by which the content distribution apparatus 104 is in communication with the entity. The communication interface 124 may include, for example, an antenna, a transmitter, a receiver, a transceiver and/or supporting hardware or software for enabling communications with one or more remote computing devices, such as over a network. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like (e.g., the content distribution network 106) by which the content distribution apparatus 104 and one or more computing devices are in communication. In an example embodiment, the communication interface 124 is at least partially embodied as or otherwise controlled by the processor 120. In this regard, the communication interface 124 may be in communication with the processor 120, such as via a bus. The communication interface 124 may additionally be in communication with the memory 122, user interface 126, and/or distribution circuitry 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. The user interface 126 may be in communication with the memory 122, communication interface 124, and/or distribution circuitry 128, such as via a bus. In embodiments wherein the content distribution apparatus 104 is embodied as one or more servers, aspects of the user interface 126 may be limited or the user interface 126 may even be eliminated.

The distribution circuitry 128 may be embodied as various means, such as circuitry, hardware, a computer program product comprising computer readable program instructions stored on a computer readable medium (e.g., the memory 122) and executed by a processing device (e.g., the processor 120), or some combination thereof and, in one embodiment, is embodied as or otherwise controlled by the processor 120. In embodiments wherein the distribution circuitry 128 is embodied separately from the processor 120, the distribution circuitry 128 may be in communication with the processor 120. The distribution circuitry 128 may further be in communication with one or more of the memory 122, communication interface 124, or user interface 126, such as via a bus.

The distribution circuitry 128 is configured in some example embodiments to distribute a content item over the content distribution network 104 to one or more terminals 102. The content item may, for example, comprise a multimedia stream, a plurality of media streams logically belonging to the same program (e.g., a video stream and the respective audio stream), a file, a set of files forming a multimedia presentation, a set of multimedia streams, a set of programs, a portion of any of the aforementioned, any combination thereof, or the like. The distribution circuitry 128 may be further configured to distribute repair data with the content item. The repair data may comprise FEC repair data, a parity codeword, Raptor code, a portion of a Reed-Solomon FEC matrix, a low-density parity code, and/or the like configured to enable error correction, reconstruction, and/or the like of the content item. The distribution circuitry 128 may be configured to calculate the repair data. The repair data or portion thereof may be interleaved or otherwise integrated with the content item by the distribution circuitry 128 as a package for distribution over the content distribution network 106.

The error correction circuitry 118 is configured in some example embodiments to receive a content item distributed by the content distribution apparatus 104 over the content distribution network 106 via a first network connection. The first network connection may, for example, comprise a broadcast connection, multicast connection, unicast connection, or the like. The first network connection may comprise a direct connection with the content distribution apparatus 104 or may comprise a connection with an intermediary device in the content distribution network 106, such as, for example, a relay, network access point, base station, radio transmitter, or the like. The error correction circuitry 118 may be further configured to receive first repair data over the content distribution network 104 via the first network connection. The first repair data may, for example, be interleaved with the content item.

The error correction circuitry 118 is further configured in some example embodiments to receive second repair data from a second terminal apparatus via a second network connection. The second network connection may comprise a peer-to-peer connection with the second terminal apparatus over the peer-to-peer network 108. The second repair data may comprise repair data that is complimentary to the first repair data to enable more robust error correction of the received content item.

The second terminal apparatus may have or be in the process of receiving the same content item and may have received the second repair data over the content distribution network 106 in the process of receiving the content item. In this regard, the distribution circuitry 128 may be configured to calculate and/or distribute a plurality of distinct repair data blocks configured to facilitate error correction of the content item. While any one of the repair data blocks may enable correction of a certain number of bit errors, packet errors, packet losses, or the like in a received version of the content item, a plurality of the repair data blocks taken together may enable correction of a greater number of bit errors, packet errors, packet losses, or the like in a received version of the content item.

Accordingly, the error correction circuitry 118 and the second terminal apparatus may receive two different repair data blocks for the same content item. As an example, the error correction circuitry 118 may receive the content item and first repair data via a connection (e.g., a broadcast connection) with a first distribution apparatus (e.g., a radio transceiver, base station, network access point, or the like) configured by the distribution circuitry 128 to distribute the content item with the first repair data and the second terminal apparatus may receive the content item and second repair data via a connection (e.g., a broadcast connection) with a second distribution apparatus (e.g., a radio transceiver, base station, network access point, or the like) configured by the distribution circuitry 128 to distribute the content item with the second repair data.

As another example, different time-slices or frequency bands may be used for distribution of the content item and the first and second repair data may be transmitted on different time-slices and/or on different frequency bands. Thus, for example, the error correction circuitry 118 may receive the first repair data on a first time-slice and/or on a first frequency band and the second terminal apparatus may receive the second repair data on a second time-slice and/or on a second frequency band.

In another example, the content item may be distributed to a plurality of terminal apparatuses via a plurality of multicast groups. Thus, for example, the first repair data may be distributed with the content item in a first multicast group and the second repair data may be distributed with the content item in a second multicast group. In a further example, the error correction circuitry 118 may receive the content item and first repair data via a first unicast connection and the second terminal apparatus may receive the content item and second repair data via a second unicast connection.

As another example, the second terminal apparatus may have calculated the second repair data based on the received content item and may share the calculated second repair data via the peer-to-peer network 108.

Exchange of repair data over the peer-to-peer network 108 may be controlled among the peers (e.g., the terminal apparatuses 102) in the peer-to-peer network 108. Alternatively, in embodiments wherein the peer-to-peer network 108 is managed by a peer-to-peer server or other control apparatus, the peer-to-peer server may handle a request for repair data and/or otherwise coordinate exchange of repair data among the peers in the peer-to-peer network 108.

The second repair data may, for example, be broadcast over the peer-to-peer network 108 such that the error correction circuitry 118 may receive the second repair data when needed. Additionally or alternatively, the error correction circuitry 118 may be configured to request the second repair data and receive the second repair data in response to the request.

The error correction circuitry 118 may be configured to automatically request the second repair data over the peer-to-peer network 108 from a terminal apparatus having received or calculated the second repair data. In this regard, the error correction circuitry 118 may be configured to obtain the second repair data in response to receipt of the content item even if the error correction circuitry 118 has not failed in an attempt to correct an error in the content item with the first repair data and/or does not anticipate poor reception conditions that may result in introduction of errors into the received content item that are not correctable with only the first repair data.

Alternatively, the error correction circuitry 118 may be configured to request the second repair data in response to a determination that the first repair data is not sufficient to correct an error in the content item. For example, the error correction circuitry 118 may use the first repair data to correct an error in the content item and determine that the first repair data is not sufficient to correct the error. The error correction circuitry 118 may accordingly request the second repair data in response to the failed error recovery.

As another example, the error correction circuitry 118 may estimate that the first repair data is not sufficient to correct an error in the content item based at least in part on one or more of current context information for the terminal apparatus 102 or estimated context information for the terminal apparatus 102. In this regard, the error correction circuitry 118 may utilize current context information and/or estimated context information to determine conditions of the first connection by which the content item is received to estimate the likelihood and/severity of errors being introduced into the content item during transmission. The current context information may comprise a current position of the terminal apparatus 102, a current geographical location of the terminal apparatus 102, a current direction of motion of the terminal apparatus 102, a current rate of motion of the terminal apparatus 102, a current time, current reception quality statistics, some combination thereof, or the like. Information about the position and motion of the terminal apparatus 102 may be determined by a GPS receiver, such as, for example, the positioning circuitry 36.

Estimated context information may comprise an estimated future position of the terminal apparatus 102, an estimated future geographical location of the terminal apparatus 102, an estimated rate of motion of the terminal apparatus 102, estimated future reception quality statistics, some combination thereof, or the like. Estimations of future position and motion of the terminal apparatus 102 may be determined based on a planned destination of the terminal apparatus 102, such as, for example, when the terminal apparatus 102 is being used for navigation. In this regard, the error correction circuitry 118 may be configured to use geo-prediction to estimate future bad reception conditions that may impact reception of the content item so as to increase the likelihood of introduction of errors into the content item during transmission.

As still a further example, the error correction circuitry 118 may receive second repair data in response to a request or command by a geo-predictive server configured to estimate when the terminal apparatus 102 will encounter bad reception conditions and require additional repair data to recover a received content item. The estimation when the terminal apparatus 102 will encounter bad reception conditions and require additional repair data to recover a received content item may be based on the current context information and/or the estimated context information of the terminal apparatus 102. The terminal apparatus 102 may send its current context information to the geo-predictive server or the geo-predictive server may receive the current context information from any network apparatus, such as a base station controller (BSC), mobile services switching center (MSC), or a visitor location register (VLR), which may be a part of the content distribution network 106. The terminal apparatus 102 may send its estimated context information to the geo-predictive server. Additionally or alternatively, the geo-predictive server may derive estimated context information for the terminal apparatus 102 based on various information, such as the past context information of the terminal apparatus, map information on roads, railroads, and/or the like; statistical information on routes traversed by terminal apparatuses 102; and/or the like. The error correction circuitry 118 may receive the second repair data from a recovery server in response to a request from the geo-predictive server.

As still a further example, the error correction circuitry 118 or the processor 110 may receive an estimate of the reception conditions encountered by the terminal apparatus 102 from a geo-predictive server. The estimate may concern a particular period of time, a particular location or area, or a combination thereof. As in the example above, the geo-predictive server may estimate the reception conditions encountered by the terminal apparatus 102 based on the current context information and/or the estimated context information of the terminal apparatus 102. The geo-predictive server may determine or access the current context information and the estimated context information as described in the previous example. Based on the estimate of the reception conditions encountered by the terminal apparatus 102, the error correction circuitry 118 or the processor 110 may estimate whether additional repair data to recover a received content item is needed. If additional repair data is estimated to be necessary, the error correction circuitry 118 may request and receive second repair data.

The error correction circuitry 118 may be further configured to use the first and second repair data to correct an error in the received content item. It will be appreciated that while example embodiments have been described with respect to two repair data blocks, additional repair data blocks may be distributed by the content distribution apparatus 104 and/or calculated by a terminal apparatus receiving a content item and distributed over the peer-to-peer network 108. In this regard, the error correction circuitry 118 may be configured to obtain repair data in addition to the first and second repair data and use the additional repair data to recover an error in a received content item.

When the content item comprises media data that comprises a plurality of source blocks, the error correction circuitry 118 may be configured to apply decoding (e.g., FEC decoding) of the first source block essentially immediately when the first source block and the first repair data block are received. Accordingly, media data contained in the first source block may be decoded and rendered as soon as possible. The error correction circuitry 118 may be configured to receive the second source block before the first source block and the first repair data block are completely received so that the second repair data block can be utilized in the FEC decoding process.

When the content item comprises multimedia content, the first and second repair data may both protect a first source block of the multimedia content. The terminal apparatus 102 may be configured to render the multimedia content while it is being received. In order to enable smooth rendering of the multimedia content without introducing noticeable delays, the error correction circuitry may be configured to receive the first repair data and second repair data before the first source block and use the first repair data and the second repair data to correct an error in the first source block before the first source block is rendered. The error correction circuitry 118 may be configured to delay rendering the multimedia content until the second repair data block is at least partly received to allow decoding. The content distribution apparatus 104, a peer-to-peer server, or other entity may indicate the required or desired delay for the start of the rendering, media decoding, or FEC decoding so as to enable the use of the second repair data.

Figure 5:
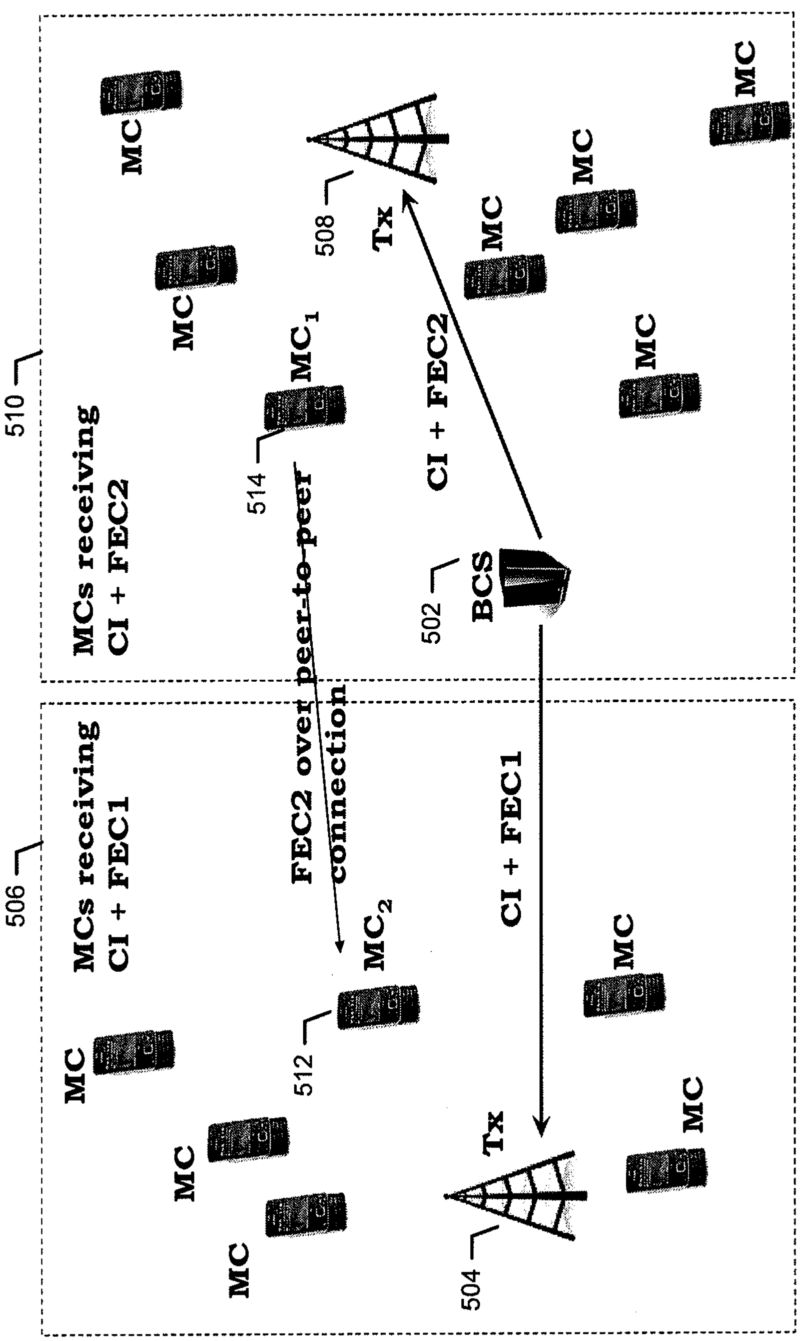
FIG. 5 illustrates a system for facilitating error correction according to an example embodiment of the present invention.

FIG. 5 illustrates a system for facilitating error correction according to an example embodiment of the present invention. In the embodiment illustrated in FIG. 5, a broadcast content server (BCS) 502 contains or has access to content items to be broadcast over a mobile broadcast network. The BCS 502 may comprise an embodiment of the content distribution apparatus 104. The BCS 502 may send a particular content item (CI) and the associated FEC repair data to the radio transmitters (Tx) of the network. The figure illustrates a network with two radio transmitters: the transmitter 504 and the transmitter 508.

The BCS 502 may transmit first FEC repair data (FEC1) to the transmitter 504 and second FEC repair data (FEC2) to the transmitter 508. Each of FEC1 and FEC2 alone may be capable of providing basic error correction capability to mobile clients (MCs), which may comprise terminal apparatuses 102. However, when FEC1 and FEC2 are used together, an enhanced error correction capability may be provided.

The transmitter 504 may broadcast CI and FEC1 to a first set 506 of mobile clients. The transmitter 508 may broadcast CI and FEC2 to a second set 510 of mobile clients. The reception conditions for mobile client $MC_2$ 512 may be sufficiently bad that it cannot fully recover from the transmission errors introduced by the radio broadcast channel. The mobile client $MC_2$ 512 may establish a peer-to-peer connection to at least mobile client $MC_1$ 514 and potentially also other mobile clients receiving the content item. $MC_2$ 512 may accordingly receive the FEC2 repair data from $MC_1$ 514. $MC_2$ 512 may therefore use both FEC1 and FEC2 to recover CI.

In some embodiments, a terminal apparatus 102 may join the peer-to-peer network 108 but does not receive the content item. Instead, the error correction circuitry 118 may be configured to obtain the first and second repair data (and/or other repair data) and reconstruct the content item using the obtained repair data.

In some embodiments wherein first and the second repair data blocks are transmitted to a terminal apparatus 102 in advance of a first source block of a content item, a processing delay in a content server end of an end-to-end system between the content server and terminal apparatus may be incurred. In this regard, when the first source block is FEC-encoded, the resulting first and second repair data blocks may be transmitted immediately. However, the transmission of the first source block itself may be delayed. The duration of the delay may relate to maximum estimated duration of a burst error, for example. Delayed transmission of the first source block in the content server end does not cause an increase in the tune-in delay experienced by receiving terminal apparatuses. In this regard, receiving terminal apparatuses may begin reception from the first source block available for reception, and the error correction circuitry 118 may start decoding of the first received source block immediately. The additional repair data sent in advance of the respective source blocks may not be received for the first received source blocks—hence, improved error correction capability may not be available for the first source blocks unless their decoding and playback is delayed.

It will be appreciated that example embodiments may be generalized to more than two different repair (e.g., FEC) data streams and more than one peer-to-peer network. Terminal apparatuses 102 receiving a content item (e.g., by tuning into a broadcast) may also join a peer-to-peer network or peer group from the set $P=\{p_1, p_2, p_3, \ldots, p_n\}$. The distribution circuitry 128 may generate a set of m unique FEC data for the same media data $F=\{f_1, f_2, f_3, \ldots, f_m\}$. This m FEC data may be sent in m different logical channels. The terminal apparatuses 102 in a peer group may be distributed such that as many as possible of the m unique FEC data streams are received by the terminal apparatuses.

Figure 6:
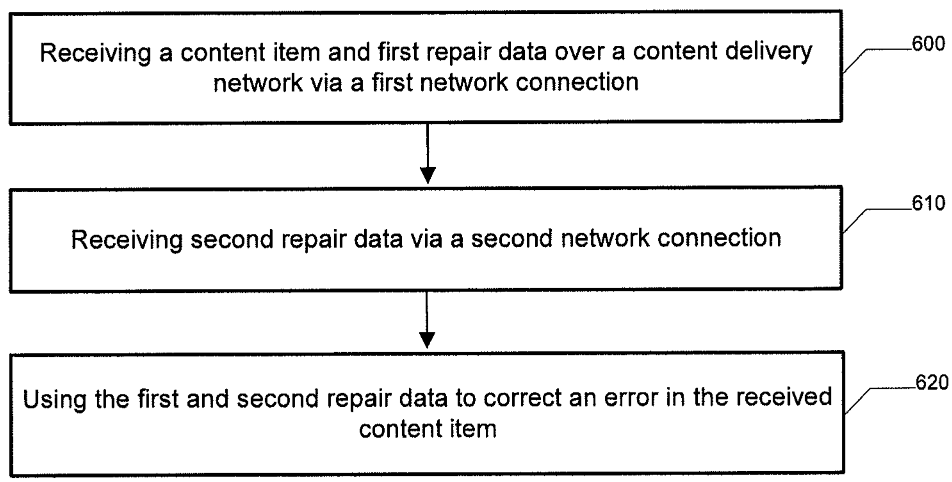
FIG. 6 illustrates a flowchart according to an example method for facilitating error correction according to an example embodiment of the invention.

FIG. 6 illustrates a flowchart according to an example method for facilitating error correction according to an example embodiment of the invention. The operations illustrated in and described with respect to FIG. 6 may, for example, be performed by, with the assistance of, and/or under the control of one or more of the processor 110, memory 112, communication interface 114, user interface 116, or error correction circuitry 118. Operation 600 may comprise receiving a content item and first repair data over a content delivery network via a first network connection. Operation 610 may comprise receiving second repair data via a second network connection. The second repair data may be received from a remote device having received the content item over the content delivery network. Operation 620 may comprise using the first and second repair data to correct an error in the received content item.

FIG. 6 is a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories (e.g., the memory 112) on which the computer program instructions may be stored such that the one or more computer-readable memories can direct a computer or other programmable apparatus (e.g., a terminal apparatus 102) to function in a particular manner, such that the computer program product comprises an article of manufacture which implements the function specified in the flowchart block(s). The computer program instructions of one or more computer program products may also be loaded onto a computer or other programmable apparatus (e.g., a terminal apparatus 102) to cause a series of operations to be performed on the computer or other programmable apparatus to produce a computer-implemented process such that the instructions which execute on the computer or other programmable apparatus implement the functions specified in the flowchart block (s).

Accordingly, blocks of the flowchart support combinations of means for performing the specified functions. It will also be understood that one or more blocks of the flowchart, and combinations of blocks in the flowchart, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (e.g., the processor 110 and/or processor 120) may provide all or a portion of the elements. In another embodiment, all or a portion of the elements may be configured by and operate under control of a computer program product. The computer program product for performing the methods of embodiments of the invention includes a computer-readable storage medium (e.g., the memory 112 and/or memory 122), such as the non-volatile storage medium, and computer-readable program code portions, such as a series of computer instructions, embodied in the computer-readable storage medium.

As such, then, some embodiments of the invention provide several advantages to computing devices, data networks, and computing device users. Some example embodiments provide apparatuses configured to obtain additional error correction data (also referred to as "repair data") beyond that received with the data content which the error correction data is configured to repair. In this regard, some example embodiments provide apparatuses configured to obtain additional repair data from one or more peer apparatuses via a peer-to-peer network. Obtainment of additional repair data in some example embodiments is triggered in response to a determination that repair data received with a content item is not sufficient to repair an error in the content item. In some example embodiments, obtainment of additional repair data is triggered in response to an estimation that repair data received with a content item is not sufficient to repair an error in the content item that may be introduced due to existing network conditions and/or estimated future network conditions. In this regard, some example embodiments facilitate more robust error correction by obtaining additional repair data when needed via a second network connection without burdening a first network connection over which a content item is received by requiring the additional repair data to be transferred with the content item regardless of whether the additional repair data is needed.

Some example embodiments improve error correction for reception of mobile broadcasts by acquiring additional FEC repair data through a peer-to-peer network. The peer-to-peer network may be formed by mobile clients receiving the same audiovisual service from the broadcast channel. In such example embodiments, a first set of the mobile clients in the peer-to-peer network receive a different set of FEC repair data than what is received by a second set of the mobile client in the peer-to-peer network. When combined, the sets of FEC repair data of these example embodiments provide a stronger error correction capability than one set of FEC repair data alone. Accordingly, in such example embodiments, a mobile client may obtain a complementary set of FEC repair data over the peer-to-peer network compared to the FEC repair data that it receives from the broadcast channel. In this regard, the error correction capability experienced by the mobile receiver is improved.

Proactive retrieval of additional repair data, such as based on geo-predicted reception conditions, as provided by some example embodiments may enable real-time streamed playback without pauses and require a smaller initial tune-in delay when compared to reactive retrieval of additional FEC repair data from a point-to-point recovery mechanism. The use of peer-to-peer network for retrieval of additional FEC repair data in accordance with some example embodiments additionally makes separate point-to-point repair servers unnecessary.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:

receiving a content item and first repair data from a content distribution apparatus over a content delivery network via a first network connection; and receiving, by error correction circuitry, second repair data via a second network connection from a remote device other than the content distribution apparatus, the remote device having received the content item over the content delivery network, wherein the first and second repair data are configured to enable error correction of the content item.

2. The method of claim 1, further comprising:

using the first and second repair data to correct an error in the received content item.

3. The method of claim 1, wherein receiving second repair data comprises receiving second repair data via a peer-to-peer network connection with the remote device.

4. The method of claim 1, wherein receiving the content item and first repair data comprises receiving the content item and first repair data via a broadcast connection from a first distribution apparatus, and wherein the remote device received the content item and second repair data from a second distribution apparatus.

5. The method of claim 1, wherein receiving the content item and first repair data comprises receiving the content item and first repair data via a first multicast connection and wherein the remote device received the content item and the second repair data via a second multicast connection.

6. The method of claim 1, wherein receiving the content item and first repair data comprises receiving the content item and first repair data via a first unicast connection and wherein the remote device received the content item and the second repair data via a second unicast connection.

7. The method of claim 1, further comprising:

determining that the first repair data is not sufficient to correct an error in the content item; and wherein receiving the second repair data comprises receiving the second repair data in response to the determination that the first repair data is not sufficient to correct an error in the content item.

8. The method of claim 7, wherein determining that the first repair data is not sufficient to correct an error in the content item comprises estimating that the first repair data is not sufficient to correct an error in the content item based at least in part on one or more of current context information or estimated context information.

9. The method of claim 8, wherein:

the current context information comprises one or more of a current position, a current geographical location, a current direction of motion, a current rate of motion, a current time, or current reception quality statistics; and the estimated context information comprises one or more of an estimated future position, an estimated future geographical location, an estimated rate of motion, or estimated future reception quality statistics.

10. The method of claim 1, wherein the content item comprises multimedia content and the first and second repair data protect a first source block of the multimedia content, the method further comprising:

causing the multimedia content to be rendered while it is being received;

receiving the first repair data and second repair data before the first source block is rendered; and using the first repair data and the second repair data to correct an error in the first source block before the first source block is rendered.

11. An apparatus comprising at least one processor and at least one memory storing computer program code, wherein the at least one memory and stored computer program code are configured, with the at least one processor, to cause the apparatus to at least:

receive a content item and first repair data from a content distribution apparatus over a content delivery network via a first network connection; and receive second repair data via a second network connection from a remote device other than the content distribution apparatus, the remote device having received the content item over the content delivery network, wherein the first and second repair data are configured to enable error correction of the content item.

12. The apparatus of claim 11, wherein the at least one memory and stored computer program code are configured, with the at least one processor, to further cause the apparatus to use the first and second repair data to correct an error in the received content item.

13. The apparatus of claim 11, wherein the at least one memory and stored computer program code are configured, with the at least one processor, to cause the apparatus to receive second repair data by receiving second repair data via a peer-to-peer network connection with the remote device.

14. The apparatus of claim 11, wherein the at least one memory and stored computer program code are configured, with the at least one processor, to cause the apparatus to receive the content item and first repair data via a broadcast connection, a multicast connection, or a unicast connection.

15. The apparatus of claim 11, wherein the at least one memory and stored computer program code are configured, with the at least one processor, to further cause the apparatus to:

determine that the first repair data is not sufficient to correct an error in the content item; and wherein the at least one memory and stored computer program code are configured, with the at least one processor, to cause the apparatus to receive the second repair data in response to the determination that the first repair data is not sufficient to correct an error in the content item.

16. The apparatus of claim 15, wherein the at least one memory and stored computer program code are configured, with the at least one processor, to cause the apparatus to determine that the first repair data is not sufficient to correct an error in the content item by estimating that the first repair data is not sufficient to correct an error in the content item based at least in part on one or more of current context information or estimated context information.

17. The apparatus of claim 16, wherein:

the current context information comprises one or more of a current position, a current geographical location, a current direction of motion, a current rate of motion, a current time, or current reception quality statistics; and the estimated context information comprises one or more of an estimated future position, an estimated future geographical location, an estimated rate of motion, or estimated future reception quality statistics.

18. The apparatus of claim 11, wherein the content item comprises multimedia content and the first and second repair data protect a first source block of the multimedia content, and wherein the at least one memory and stored computer program code are configured, with the at least one processor, to further cause the apparatus to:

causing the multimedia content to be rendered while it is being received;

receive the first repair data and second repair data before the first source block is rendered; and use the first repair data and the second repair data to correct an error in the first source block before the first source block is rendered.

19. The apparatus of claim 11, wherein the apparatus comprises or is embodied on a mobile phone, the mobile phone comprising user interface circuitry and user interface software stored on one or more of the at least one memory; wherein the user interface circuitry and user interface software are configured to:

facilitate user control of at least some functions of the mobile phone through use of a display; and cause at least a portion of a user interface of the mobile phone to be displayed on the display to facilitate user control of at least some functions of the mobile phone.

20. A computer program product comprising at least one non-transitory computer-readable storage medium having computer-readable program instructions stored therein, the computer-readable program instructions comprising:

program instructions configured to cause receipt of a content item and first repair data from a content distribution apparatus over a content delivery network via a first network connection; and program instructions configured to cause receipt of second repair data via a second network connection from a remote device other than the content distribution apparatus, the remote device having received the content item over the content delivery network, wherein the first and second repair data are configured to enable error correction of the content item.

21. The computer program product of claim 20, wherein the program instructions configured to cause receipt of second repair data comprise program instructions configured to cause receipt of second repair data via a peer-to-peer network connection with the remote device.

* * * * *